United States Patent [19]

Thompson

[11] Patent Number: 4,561,043
[45] Date of Patent: Dec. 24, 1985

[54] DECORATIVE LIGHT DISPLAY

[76] Inventor: Gary J. Thompson, 8353 Minuet Pl., Panorama City, Calif. 91402

[21] Appl. No.: 654,983

[22] Filed: Sep. 27, 1984

[51] Int. Cl.$^4$ ............................................. F21V 7/04
[52] U.S. Cl. ................................... 362/32; 362/806; 362/812
[58] Field of Search .................... 362/32, 806, 812

[56] References Cited

U.S. PATENT DOCUMENTS

| | | | |
|---|---|---|---|
| 3,497,981 | 3/1970 | Tyne | 362/32 |
| 3,535,018 | 10/1970 | Vasilatos | 362/32 |
| 4,234,907 | 11/1980 | Daniel | 362/32 |

Primary Examiner—William A. Cuchlinski, Jr.
Attorney, Agent, or Firm—Roger A. Marrs

[57] ABSTRACT

A light display is disclosed herein for decorative purposes including a light source emitting light rays through a dichroic filter for removing undesired color and infrared rays followed by introducing the filter rays into a selected, polished end of a light conducting rod or mirrored tube. Selected peripheral areas of the rod or tube are etched or apertured to permit exit of light therethrough at predetermined locations along the length of the rod or tube. The end of the rod or tube opposite from its polished end is provided with a mirror for reflecting light rays back through the rod or tube.

2 Claims, 11 Drawing Figures

U.S. Patent  Dec. 24, 1985  4,561,043
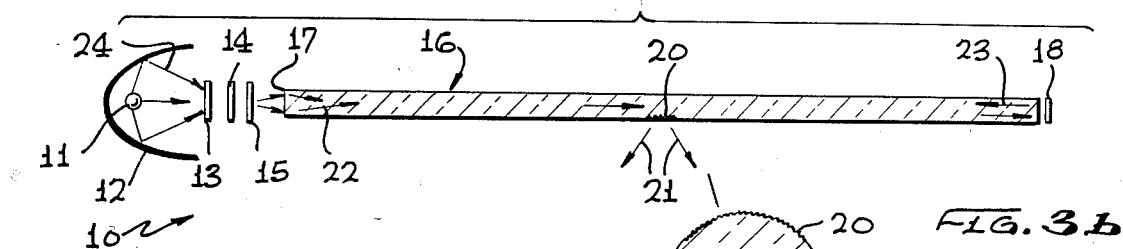
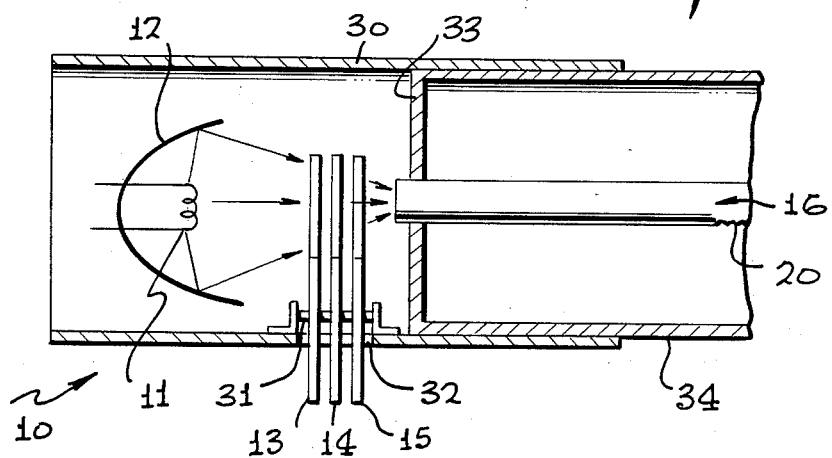
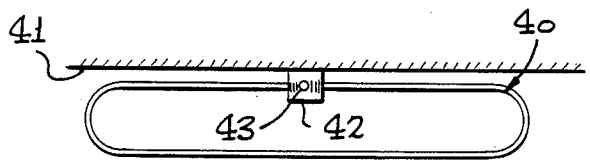
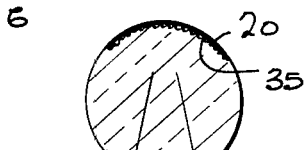
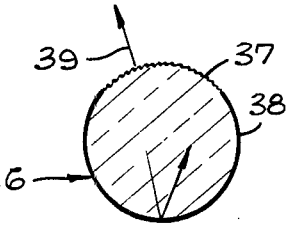
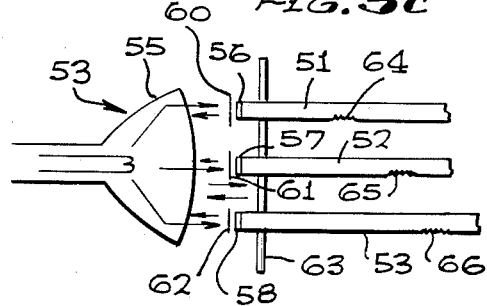
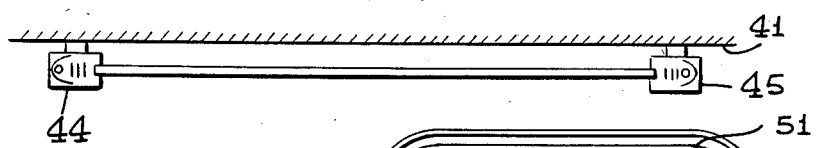
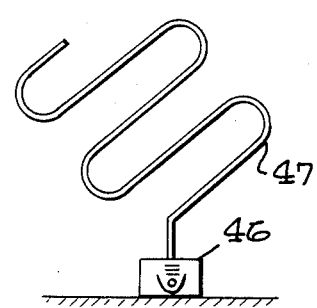
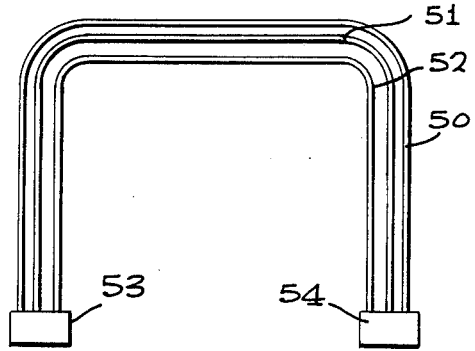
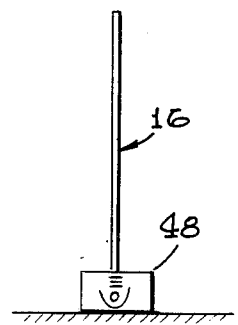

DECORATIVE LIGHT DISPLAY

BACKGROUND OF THE INVENTION

1. Field of the Invention

The present invention relates to decorative devices and more particularly to a novel decorative device in the lighting field whereby light is applied to the end of a light conducting tube or rod having exiting ports or areas selectively permitting light to pass therethrough for visible decorative purposes.

2. Brief Description of the Prior Art

It has been the conventional practice to use light devices of either a gaseous fluorescent type or of a fiber optic light ray conducting type for decorative purposes wherein the tube or rod is configured into a selective geometry so as to display a desired visual effect. Usually, the entire tube or rod is illuminated and the initial source of light is provided by either the gaseous contents of the tube or from a single point light source which illuminates the entire rod or tube. In either prior instance, light is intended to exit from the external surfaces of the tube or rod and no attempt is made to selectively provide windows or other exiting ports for light rays. Some attempts have been made to completely block exiting of light rays by providing an external paint or coating which adheres to the external surface of the tube or rod and is used for the sole purpose of preventing exiting of light rays.

Such prior attempts have greatly standardized the use of light rods for decorative purposes and has greatly limited the attractiveness and visual display value for such lighting systems for decorative purposes.

Therefore, a long standing need has existed to provide a novel lighting system incorporating a point or single source light that emits light for reception and conduction through a light tube or rod and wherein selected portions along the length of the rod are open for exiting of light rays therethrough for decorative purposes. Means should also be provided for maximizing intensity of light exiting by providing for use of reflected or back light that is reconducted through the tube after initially traversing the tube without exiting through the exit ports or windows.

SUMMARY OF THE INVENTION

Accordingly, the above problems and difficulties are obviated by the present invention which provides a novel lighting system for use in decorative situations which comprise a light source having reflective means for transmitting light rays into a polished end of an elongated light rod or mirrored tube. The rod or tube is provided with a plurality of spaced apart exit windows or openings through which light rays conducted through the rod or tube may exit to provide decorative display. In one form of the invention, a light rod is provided with etched areas on its exterior surface constituting an exit window or opening while in the version of a mirrored tube, absence of mirrored substance on the tube constitutes a light window. The end of the rod or tube from its end adjacent the light source is provided with a mirrored surface or means for redirecting light rays back through the tube after the rays have traversed the tube without exiting through a window or aperture.

A variety of geometrical configurations are envisioned as well as providing a plurality of light conducting tubes or rods deriving light rays from a single source. Also, it is envisioned that a dichroic filter is disposed between the light source and the end of the rod or tube.

With respect to the light exiting windows or areas, the present invention comtemplates either etched and/or etched and mirrored areas which will reflect light through the opposite side of the rod or tube as well as providing mirrored areas on the outside of a tube for reflecting light rays through an etched area on an opposite side of the tube.

Therefore, it is among the primary objects of the present invention to provide a novel decorative lighting system incorporating a light rod or tube having a plurality of light exiting windows or openings provided along its length through which light may escape to provide an attractive illuminated effect.

Another object of the present invention is to provide a novel decorative lighting system incorporating a point light source for presenting light rays through a filter to one end of a light rod or mirrored tube having a plurality of predetermined etched or mirrored areas for directing light rays exteriorly of the rod or tube for special decorative effects.

Still another object of the present invention is to provide a novel decorative lighting system wherein a plurality of geometrical configurations can be made with an elongated light rod or mirrored tube having light ray exiting areas spaced along the length thereof to produce decorative and visually attractive results.

Still a further object of the present invention is to provide such a novel decorative lighting system which not only includes the aforementioned light exiting windows or openings but includes a mirrored light ray redirection means whereby the light is intensified by full utilization of light rays passing through the entire length of the tube or rod.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a diagrammatic view of the novel decorative lighting system incorporating the present invention;

FIG. 2 is an enlarged fragmentary view, in section, of the light source, filter and luminous rod or mirrored tube incorporating the present invention;

FIGS. 3a, b, c are transverse cross-sectional views of a light rod illustrating a variety of light ray exiting windows or openings that may be selectively located along the length of the rod shown in either FIGS. 1 and 2;

FIG. 4 is a side elevational view of a single source dual filter mounted on a wall structure;

FIG. 5 is a side elevational view of a wall mounted dual source, dual filter version of the present invention;

FIG. 6 is a nonlinear version of the present invention showing a curved geometrical configuration;

FIG. 7 is a floor stand version of the present invention;

FIG. 8 is a side elevational view of another embodiment of the present invention showing multiple or plurality of illuminating rod or mirrored tubes; and FIG. 9 is a diagrammatic view of the multiple rod or mirrored tube version deriving light rays from a single parabolic light source.

DESCRIPTION OF THE PREFERRED EMBODIMENT

Referring to FIG. 1, the novel decorative lighting apparatus of the present invention is illustrated in the general direction of arrow 10 which includes a light source having a bulb or other emitter 11 which is centered within an ellipsoidal reflector 12 so that light rays emanating from the bulb reflect against the inner surface of the reflector 12 and are directed through a dichroic filter system. The filter system comprises at least three dichroic subtractive filters such as a cyan filter disk 13, a magenta filter disk 14 and a yellow filter disk 15. On the side of the filter system opposite from its side receiving light rays from the light source, there is provided an elongated rod or mirrored tube identified by numeral 16. In the present instance, a light transmitting rod is illustrated which may be composed of quartz, plexiglass, borosililate or other such suitable material. The light rays passing through the filter are introduced to a polished end 17 of the rod and conducted through the rod to its opposite end where the rays impinge against a mirrored surface or mirrored glass 18. Such light rays will be reflected back through the tube so as to increase intensity of the light.

Located along the peripheral exterior surface of the tube 16, there is provided at least one exit window for the light rays and such a window is indicated by numeral 20. The light opening or window 20 is an etched surface where the light rays striking such a surface will exit the rod. Exiting light rays are indicated in general by arrow 21. Arrows 22 indicate light rays entering the polished end 17 of the rod 16 while numeral 23 indicates reflected light from the mirror 18 returning through the rod 16. Arrows 24 generally illustrate light from the source 11 which is reflected from the reflector 12 and introduced into the filter system. It is to be understood that although a single light exiting opening or window 20 is illustrated, a plurality of such openings may be provided in accordance with a particular decorative scheme.

Referring now in detail to FIG. 2, a specific embodiment is illustrated wherein the reflector 12 and light source 11 are suitably mounted within a tube 30 by conventional means. Also, the plurality of filters 13, 14 and 15 are rotatably mounted within the tube 30 on a shaft 31 about which the respective filters may be rotated. Rotation takes place manually by means of extension handles which pass through an opening 32 in the tube 30 and outwardly project from the exterior of the tube so that the user may readily turn any of the filter disks carried on the shaft 31. The tube 16 may be mounted on its opposite ends through openings provided in walls, such as end wall 33 of an enclosure tube 34. The composition of the enclosure tube may be such to augment the decorative effect of the light emanating from the respective openings or windows on the rod 16 or, preferably, the composition of the tube 34 is transparent or translucent so as to permit light to pass therethrough and to be observed when illuminated by light passing through the respective openings or windows 20.

Referring to FIG. 3a, it can be seen that the rod 16 is solid and composed of a light transmitting material. Exiting of light from the rod is via the etched window or light opening indicated by numeral 20. Etching is placed on the external surface of the rod and light will pass therethrough when impinged upon as light rays travel through the rod.

Referring to FIG. 3b, another embodiment of the invention is shown wherein the rod 16 not only includes an etched area indicated by numeral 20 but includes a mirrored layer 35 so that light attempting to leave through the etched area 20 will be redirected through the tube as shown by the arrows 36 for emergence from the opposite side. In FIG. 3c, rod 16 is provided with an etched area 37 constituting a window or opening through which light will travel particularly in view of a mirror coating 38 placed on the external surface of the rod 16 in all areas except where the window 37 is provided. The emitted light ray is indicated by numeral 39.

Referring now in detail to FIG. 4, another embodiment of the present invention is shown wherein an oval configuration of rod is indicated by numeral 40 which is mounted on the surface of a wall 41 via a housing or mounting block 42. The housing 42 encloses the light source indicated by numeral 43 which includes a single source, dual filter arrangement. A multiplicity of openings or light windows are provided along the exterior surface of the tube or rod 40 as previously described.

With respect to FIG. 5, a wall mounted unit is indicated by numerals 44 and 45 including a dual filter arrangement such that each filter is associated with each of the light sources.

Referring to FIG. 6, it can be seen that the light rod may be configured to other geometric shapes than oval or the like. The light source including reflector and filter is indicated by numeral 46 and the convoluted geometric configuration is generally indicated by numeral 47.

In FIG. 7, a free standing decorative light incorporating the present invention is illustrated wherein the rod 16 is standing in a vertical orientation with respect to a base or housing 48 which includes a light source having a reflector and filter arrangement as previously described.

In FIG. 8, it can be seen that the present invention envisioned not only a single tube as previously described but a multiplicity of rods or tubes and, in the present instance, rods 50, 51 and 52 are illustrated. These rods are arranged in fixed parallel spaced apart relationship Having their opposite ends attached to housings 53 and 54 which provide the necessary light source. Etched areas forming openings or windows for light to escape from the confines of the rod may be provided along the length of any one of the rods 50, 51 or 52.

Referring now in detail to FIG. 9, the light source 53, as an example, is referred to as a parabolic light source and is indicated by numeral 55. A plurality of dichroic filters, as previously described, are employed and are indicated by numerals 56, 57 and 58. However, this embodiment of the invention also includes adjustable mirrored shutters immediately disposed between the light source 53 and the filters are represented by the numerals 60, 61 and 62 respectively. The filter mirrored shutter arrangement prevents light from entering a particular rod by reflecting the rays back to the reflector for redirection to another filter and mirrored shutter combination for selective application of the rays to the rod end. Also, a mirrored baffle 63 is employed about the polished ends of the respective tubes 51, 52 and 53. The light windows or openings on each tube are respectively indentified by numerals 64, 65 and 66.

It is to be understood that FIGS. 3a, b and c may be represented by a tube in place of the illustrated rod. In this version, the mirror is placed on the outside or inside for reflected light emergence opposite from the mirror.

Actual operation will be described with respect to the embodiments shown in FIGS. 1-2 inclusive. It is noted that light emitted from the source 11 is directed by reflector 12 through the dichroic filter arrangement of disks 13, 14 and 15. Unwanted color and infrared rays are removed. Desired color ray combinations are passed therethrough. Light enters at the polished end 17 of the rod or, if a mirrored tube is used, and continues until the light strikes an etched surface where it exits the rod. Light that travels to the end of the rod is reflected back via mirror 18. Such redirection greatly enhances the intensity and overall efficiency of the light tube as a light disbursing generator for decorative purposes.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A decorative light display comprising:

a light source emitting light rays;

an elongated, rigid and non-flexible light conducting member of constant cross section receiving said light rays at a selected end and its opposite end having a reflective material for redirecting said light rays back through said member;

said light conducting member of constant cross section provided with an external peripheral opaque material and a plurality of openings constituting windows through said material at selected locations along the length of said member for emitting light;

a dichoic filter disposed between said light source and said member selected end;

said member selected end is polished to facilitate light ray passage and introduction into said member;

said member is a translucent rod and said openings are etched portions exposed through said opaque material; and said member is a rod having said opaque material a mirrored coating with said openings therethrough at predetermined locations to emit light for decorative purposes.

2. The invention as defined in claim 1 wherein:

said rod is configured into a pre-selected geometric shape folded over upon itself.

* * * * *